US006342462B1

(12) United States Patent
Kulprathipanja

(10) Patent No.: US 6,342,462 B1
(45) Date of Patent: Jan. 29, 2002

(54) PROCESS FOR REGENERATING AN ADSORBENT

(75) Inventor: Santi Kulprathipanja, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/274,005

(22) Filed: Mar. 22, 1999

(51) Int. Cl.[7] .............................. B01J 38/64; B01J 38/48
(52) U.S. Cl. .............................. 502/25; 502/22; 502/28
(58) Field of Search .............................. 502/22, 25, 85, 502/28; 210/681

(56) References Cited

U.S. PATENT DOCUMENTS

| 4,088,737 A | | 5/1978 | Thomas et al. ............. 423/240 |
| 4,485,183 A | * | 11/1984 | Miller et al. ................... 502/25 |
| 4,530,910 A | * | 7/1985 | Mross et al. ................... 502/25 |
| 4,615,806 A | | 10/1986 | Hilton ........................ 210/690 |
| 4,615,991 A | * | 10/1986 | Obayashi et al. ............. 502/28 |
| 4,744,825 A | * | 5/1988 | Chen et al. |
| 5,538,530 A | * | 7/1996 | Heaton et al. |
| 5,866,735 A | * | 2/1999 | Cheung et al. |
| 5,888,919 A | * | 3/1999 | Bartholic ..................... 502/22 |
| 5,900,383 A | * | 5/1999 | Davis et al. .................. 502/22 |
| 6,013,593 A | * | 1/2000 | Lee et al. |
| 6,080,696 A | * | 6/2000 | Duke et al. |

* cited by examiner

*Primary Examiner*—Steven P. Griffin
*Assistant Examiner*—Christina Ildebrando
(74) *Attorney, Agent, or Firm*—John G. Tolomei; Frank S. Molinaro

(57) ABSTRACT

A novel process for the regeneration of a solid adsorbent which is at least partially spent and has a reactive metal (e.g. silver) dispersed thereon is disclosed. The regeneration consists of a step whereby accumulated metal-containing reaction products formed during adsorptive service are removed by stripping the spent or partially spent adsorbent with a suitable stripping solution such as sodium thiosulfate. After detrimental metal-containing deposits are stripped, the adsorbent is then subjected to a reactivation step in which the regenerated adsorbent is contacted with a solution containing a reactive metal compound (e.g. silver nitrate). Reactivating the adsorbent therefore adds an incremental amount of the reactive metal onto the adsorbent. Regeneration of the adsorbent according to the two-step method of the present invention thus effectively prolongs its useful life. The present invention is particularly applicable to adsorbents used in processes involving the adsorption of iodine-containing compounds from contaminated feed streams.

13 Claims, No Drawings

PROCESS FOR REGENERATING AN ADSORBENT

FIELD OF THE INVENTION

The present invention relates to a novel process for regenerating an adsorbent which is at least partially spent, the adsorbent comprising a solid carrier, preferably a resin or a molecular sieve, a reactive metal dispersed thereon, and a reaction product. The regeneration process comprises a) contacting the absorbent with a stripping solution at stripping conditions, thereby removing at least a portion of the reaction product and yielding a stripped adsorbent, and b) reactivating the stripped adsorbent at reactivation conditions with a solution containing a compound of the reactive metal.

BACKGROUND OF THE INVENTION

The economic attractiveness, or sometimes even the utter viability, of many adsorptive industrial chemical and petroleum refining processes depends greatly on the existence of a practical adsorbent regeneration process. Regenerative techniques are desirable because expenses associated with exchanging a spent adsorbent for a new charge, particularly when several thousands of pounds of material are involved, often far outweigh those associated with regeneration. In general, then, the major objective of regeneration processes is to prolong the useful life of an adsorbent through restoration of its activity. The steps to achieve such performance revival vary significantly and are usually developed only through careful research and experimentation.

For solid adsorbents having a reactive metal to selectively remove feed contaminants, the effectiveness of the reactive metal rests on its ability to form stable complexes with the undesired species. These complexes, or reaction products of the reactive metal and feed contaminants, remain fixed to the solid, accumulate during adsorptive service, and eventually interfere with adsorbent performance. Therefore, the regeneration of reactive metal-containing adsorbents requires, at least as an initial step, the removal or stripping of accumulated reaction products. In U.S. Pat. No. 4,088,737, this removal is achieved through subjecting the adsorbent to a high-temperature, hydrogen-rich gas stream. The adsorbent to which this procedure applies is a silver-exchanged zeolite used for the selective removal of iodine-containing contaminants from gas streams.

In further prior-art teachings related to iodine-containing compound adsorption using a solid adsorbent having a reactive metal dispersed thereon, a major subject of interest is in the purification of corrosive liquid feed streams. Most notable are iodine-compound contaminated commercial carboxylic acid products, primarily acetic acid streams, resulting from modern methanol carbonylation manufacturing methods. Considerable development efforts in acetic acid purification technology have focused on different types of solid adsorbents containing iodine-reactive metals such as silver, mercury, copper, lead, thallium, palladium or combinations of these metals known to react with iodine-containing compounds to form insoluble reactive metal compounds.

For example, in U.S. Pat. No. 4,615,806, the removal of iodine-containing impurities is achieved with a macroreticulated strong acid cation-exchange resin which is stable in the organic medium and has at least one percent of its active sites converted to the silver or mercury form, presumably by cation-exchange. Later disclosures point to the utility of several other types of resins, all of which require a reactive metal to achieve the required adsorption efficiency. Overall, therefore, the prior art teachings related to adsorbents suitable for iodine-containing compound removal from gas and liquid streams specify metal-exchanged zeolites and resins.

As noted in the aforementioned '737 patent, metal-exchanged zeolites used as adsorbents in iodine-containing compound removal processes can be stripped of accumulated reaction products using high-temperature gas streams. In contrast, the application of metal-exchanged resins for iodine-containing compound adsorption greatly restricts the range of acceptable stripping temperatures. This is due to decomposition, softening, loss of strength, or other detrimental structural changes resulting from thermal effects on resins.

The present invention provides a novel solution to address the regeneration of a wide variety of spent or partially spent metal-loaded solid adsorbents which overcomes detrimental effects of prior art techniques associated with high temperature exposure. The condition of an adsorbent being at least partially spent is characterized by its having, in addition to a solid carrier and a reactive metal dispersed thereon, a compound of the reactive metal, which is understood as the reaction product of the reactive metal and the adsorbed species. The regeneration process involves contacting the adsorbent with a stripping solution capable of removing reaction products formed during the adsorption step, followed by dispersing an additional amount of metal onto the adsorbent. The latter procedure is a reactivation step, which involves contacting the adsorbent, which has been stripped or depleted in at least some reactive metal following exposure to the stripping solution, with an aqueous reactivation solution of the reactive metal cation.

Applicant has found that stripping solutions such as sodium thiosulfate can be used to remove reaction products from an adsorbent without the need for elevated temperatures. More surprising is the fact that such solutions can remove these reaction products even though such compounds are insoluble in corrosive liquid media (e.g. acetic acid) with which they are in continual contact during adsorptive service. Furthermore, the stripping of these accumulated reaction products occurs without any corresponding deleterious effects on the solid carriers, whether they be resins containing functional groups, molecular sieves having ion-exchange sites within a microporous channel network, or other suitable materials known in the art.

Applicant has further found that, subsequent to stripping accumulated reaction compounds of the reactive metal from the partially spent adsorbent, a simple reactivation procedure is beneficial for restoring the reactive metal content of the adsorbent. This reactivation can be performed at conditions similar to those used when originally dispersing reactive metal onto the adsorbent during its preparation. Contacting the stripped adsorbent with an ion-exchange solution is therefore appropriate when the adsorbent is first prepared using ion-exchange to disperse the reactive metal.

Both steps of the regeneration process (stripping and reactivating) can be performed under mild temperatures and pressures. This two-step regeneration technique of the present invention provides essentially complete restoration of adsorbent performance.

SUMMARY OF THE INVENTION

A primary object of the present invention is to provide a process for regenerating an adsorbent which is at least partially spent, the adsorbent comprising a solid carrier, a reactive metal dispersed thereon, and a reaction product of the reactive metal and a contaminant, the process comprising:

(a) stripping the adsorbent with a stripping solution at stripping conditions, thereby removing at least a portion of the reaction product and yielding a stripped adsorbent and an effluent stream containing the reaction product; and (b) reactivating the stripped adsorbent with a reactivation solution of a compound of the reactive metal at reactivation conditions, thereby dispersing an amount of reactive metal onto the adsorbent.

In a particular embodiment the present invention is a process for regenerating an adsorbent which is at least partially spent, the adsorbent comprising a resin or a molecular sieve, a reactive metal selected from the group consisting of silver, mercury, copper, lead, thallium, palladium and mixtures thereof dispersed thereon, and a metal iodide reaction product of the reactive metal and a contaminant, the process comprising:

(a) stripping the adsorbent with an aqueous solution of an alkali metal compound of an anion selected from the group consisting of thiosulfate, cyanide, iodide, and mixtures thereof, thereby removing at least a portion of the metal iodide reaction product and yielding a stripped adsorbent and an effluent stream containing the metal iodide reaction product; and (b) reactivating the stripped adsorbent with a reactivation solution of a compound of the reactive metal at reactivation conditions, thereby dispersing an amount of reactive metal onto the adsorbent.

Other objectives and embodiments associated with the invention are discussed in the following detailed description.

DETAILED DESCRIPTION OF THE INVENTION

The adsorbent to which the process of the present invention applies comprises broadly any solid carrier having a reactive metal dispersed thereon where the metal is selected to react with and thereby adsorb particular undesired contaminants from a feed stream. Specific examples of adsorbents which fall within the scope of the present invention are prevalent in descriptions of techniques for the adsorption of 1) radioactive iodine-containing compounds from nuclear waste gas feed streams as well as 2) trace iodine-containing compounds from commercial acetic acid feed streams. In both methods, an adsorbent comprising a solid carrier having silver dispersed thereon is preferred, where the carrier is appropriately selected to withstand the environment of the adsorption process.

The main requirement of any carrier material is its ability to withstand the environments of both its normal adsorptive service and the regeneration process of the present invention. Based on the prior art, zeolites and resins are useful as carriers because of their ability to incorporate reactive metals into their molecular frameworks by ion-exchange. This method of metal dispersion promotes a uniform distribution (since ion-exchange sites are concentrated evenly throughout the solid carrier) and provides a very stable metal-exchanged adsorbent. A further advantage of using zeolites in some applications is their selectivity for reacting specifically shaped and sized molecules, as dictated by the configuration of the microporous channels through which they must diffuse. Certainly, other suitable carrier materials known in the art including crystalline compounds such as alumina or amorphous supports such as activated carbon are also applicable to the present invention. A variety of methods for dispersing reactive metals onto such supports are known in the art.

More broadly, any type of molecular sieve and not only a zeolite may serve as a carrier material for the adsorbent of the present invention. While a zeolite is a crystalline aluminosilicate, a molecular sieve can contain cations other than $Al^{+3}$ and $Si^{+4}$ situated within tetrahedral sites of an extensive three-dimensional network of oxygen ions. Types of materials classified as molecular sieves are explained in detail in *Molecular Sieves, Principles of Synthesis and Identification* by R. Szostak (Van Nostrand Reinhold, 1989) at pages 2–4. These include silicas, metalloaluminates, aluminophosphates, and others. Overall, therefore, carrier materials can include, for example, zeolites such as LZ-210, Y-85, or mordenite; molecular sieves such as crystalline manganese phosphates, titanosilicates (Szostak, p. 250–252), or silicoaluminophosphates (Szostak, p. 269–272); or resins such as Amberlyst-15 (Rohm and Haas, Philadelphia, Pa.), Reillex 425 (Reilly Industries, Indianapolis, Ind.), or Deloxan THP (Degussa AG, Frankfurt, Germany). The zeolites LZ-210 and Y-85 are defined in U.S. Pat. Nos. 4,503,023 and 5,013,699, respectively, and details pertaining to the synthesis and characterization of these materials are contained in these references. The zeolite mordenite is described according to its structure and properties in *Zeolite Molecular Sieves* by Donald W. Breck (John Wiley and Sons, 1974) at pages 122–124 and 162–163. Crystalline manganese phosphates may be naturally occurring or synthesized according to procedures outlined in U.S. Pat. No. 5,780,003.

As stated, the adsorbent which is used to treat a contaminated feed stream comprises a solid carrier material, preferably a resin or a molecular sieve, onto which a reactive metal has been dispersed. The adsorbent is typically formed into a pellet, pill, or extrudate according to techniques well known in the art. Also, the adsorbent is normally used in a fixed-bed configuration through which a contaminated feed stream is passed during adsorptive service. Of course, a moving- or fluidized-bed system is also possible as well as a batch operation. The adsorption step may even use a plurality of adsorption zones with the desired conditions maintained between and within the separate beds. Optimal adsorption pressures, temperatures, flow rates, and bed configurations are dependent upon the specific process.

When the adsorbent of the present invention is exposed during its normal adsorptive service to a contaminated feed stream, the reactive metal gradually becomes consumed (i.e. the adsorbent becomes partially spent). At some point, the adsorbent loses its effectiveness due to 1) an excess of accumulated reaction products, or compounds of the reactive metal on the surface or within the pores of the carrier resulting from the reaction of the reactive metal with feed contaminants, or 2consumption of substantially all of the reactive metal. Both situations will result in a loss of adsorbent performance, so that the treated feed stream, or effluent from the adsorptive process, may no longer conform to the desired purity level or quality. In the former case, however, a considerable portion of the reactive metal, which has not reacted with feed contaminants, may still be present on the adsorbent. Performance loss then results from inaccessibility to the reactive metal sites by the feed stream contaminants, due to the buildup of reaction products of the reactive metal on the adsorbent surface and corresponding pore blockage. Thus, a partially spent adsorbent is one where some of the reactive metal has been converted to reaction products which can block access of contaminants to reactive metal sites. A substantially spent adsorbent is one where substantially all of the reactive metal has been converted to reaction products.

Without intending to limit the scope of the present invention by the following explanation, experimentation has provided a basis for understanding adsorptive mechanisms where the adsorbent comprises a reactive metal on a solid carrier. For example, in the particular case where the adsorbent is a silver-exchanged resin used for the removal of methyl iodide from acetic acid, the reaction product accumulating on the resin during adsorptive service and eventually reducing adsorption activity has been found to be silver iodide. Overall, it is theorized that the adsorption of methyl iodide is accompanied by not only the formation of silver iodide, but also the esterification of a stoichiometric amount (which is typically extremely small) of acetic acid to methyl acetate, and the conversion of resin ion-exchange sites from their silver to hydrogen form. Electron microscopy analysis of partially spent resin-based and zeolitic silver-exchanged adsorbents after methyl iodide removal service has indicated a migration of silver iodide and subsequent agglomeration at various points on the outer surface of the adsorbent.

Once the adsorbent is at least partially spent, it can be regenerated by the process of the resent invention. The first, or stripping, step in the process involves contacting an appropriate stripping solution with the spent or partially spent adsorbent bed until no measurable reaction products are in the stripping solution effluent stream. A given stripping solution is suitable when it is capable of dissolving the accumulated reaction products but not the adsorbent carrier. To determine whether the adsorbent is sufficiently stable in the stripping solution, a simple test comprises subjecting the adsorbent to pure stripping solution at stripping conditions, typically ambient pressure and temperature. Any substantial dissolution of the adsorbent usually appears as a precipitate in the stripping solution effluent liquid.

Examples of stripping solutions include, but are not limited to, aqueous solutions of alkali metal compounds selected from the group consisting of thiosulfates, cyanides, and iodides. Thiosulfate solutions are preferred, with sodium thiosulfate being especially preferred due to its relatively low associated health risks and ready availability. For the alkali metal thiosulfate, cyanide, and iodide stripping solutions, a wide range of concentrations are possible. However, it is usually convenient to use concentrations of the alkali metal compounds ranging from about 2% to about 50% by weight of the stripping solution. Likewise, although a broad range of pressures and temperatures are possible for the stripping step, mild conditions, of about 0.5 to about 5 atmospheres and about 20° C. to about 150° C., are usually most practical. The stripping step can be performed batchwise, but a continuous mode is preferred, where the stripping solution flow rate is from about 0.1 to about 10 hr$^{-1}$ liquid hourly space velocity (LHSV). As understood in the art, the LHSV is the hourly volumetric liquid feed flow rate divided by the adsorbent volume and represents the reciprocal of the average time of the liquid within the adsorbent bed.

In general, therefore, contacting the adsorbent with a suitable stripping solution at the aforementioned conditions effectively frees the pores or channels of the adsorbent and thereby reduces diffusion resistance of feed contaminants to reactive metal sites. However, adsorbent performance is not restored by the stripping step alone, but must be followed by a replacement of the reactive metal. For this reason, after removing the detrimental accumulated reaction products, reactivating the resulting stripped adsorbent can be performed to replenish the reactive metal lost through reaction with feed contaminants.

In the reactivating step of the present invention, an additional amount of reactive metal is dispersed onto the adsorbent. Reactivating in general involves the contacting of the stripped adsorbent with a solution of a compound of the reactive metal. The procedure is generally similar to that used when first adding reactive metal onto the solid carrier during adsorbent preparation. This is accomplished by ion-exchange, pore filling, evaporative impregnation, or other means known in the art. The use of any aqueous solution of the reactive metal is appropriate, but a non-aqueous organic medium may also be used provided sufficient solubility of the salt is possible. Acetate, nitrate, or halide compounds of the reactive metal are ordinarily very effective for the reactivating step. For example, a silver nitrate solution can be used as a reactivation solution for a silver-containing adsorbent. For the solution used in the reactivating step, it is preferred that concentrations of the reactive metal compound from about 0.1% to about 10% by weight are used. The amount of metal dispersed onto the adsorbent during reactivation is preferably from about 0.5 to about 1.5 of the amount originally dispersed, although this quantity may vary depending on the degree of adsorbent deactivation. Other preferred conditions associated with the reactivation step include a pressure of about 0.5 to about 5 atmospheres and a temperature of about 20° C. to about 100° C. The reactivation may be performed batchwise, but a continuous mode is preferred, where the reactivation solution flow rate is preferably from about 0.1 to about 10 hr$^{-1}$ LHSV.

Reactivating the adsorbent with a metal cation solution can be repeated to obtain a desired level of reactive metal on the adsorbent. In some cases, drying and calcining the material between such reactivation treatments may improve penetration of the reactive metal into the solid carrier and thereby increase adsorption capacity. After completing the reactivating step, it is preferred to dry the reactivated adsorbent to remove any residual solution which might otherwise contaminate a feed stream during adsorptive service. Because the reactivating step disperses an additional amount of reactive metal onto the adsorbent, extended use of the adsorbent is achieved.

Since the reactivation step in itself does not diminish the amount of reaction product accumulated on the adsorbent, both the metal compound removal (stripping) and reactive metal addition (reactivation) procedures are necessary for the adsorbent regeneration process of the present invention. Using these steps dramatically increases the effective adsorbent life with a relatively simple and mild regeneration process, compared to those of the prior-art.

Metal recovery from the stripping solution effluent stream produced in the first contacting step may be desired for economic reasons. The application of a secondary adsorbent such as activated carbon for this purpose is described in U.S. Pat. No. 4,892,723 for the case where the stripping solution is a thiosulfate solution. Such an additional recovery step can also be applied and is within the scope of the present invention.

The following example illustrates the present invention. While this example is provided to illustrate the invention, it is not intended to limit it.

EXAMPLE 1

An adsorbent containing LZ-210 zeolite and a silica binder in an approximate weight ratio of 4/1 was prepared specifically for the adsorption of iodine-containing compounds from acetic acid. The zeolite component had a silica to alumina ratio of about 12 and was ion-exchanged with silver such that the adsorbent contained 10.2% silver by weight. The silver content was determined using atomic adsorption spectroscopy (AAS) analysis. The adsorbent particles were spherical with an average diameter of about 2 mm. A 10 milliliter sample of this adsorbent was subjected to an acetic acid feed stream contaminated with 586 ppm by weight of total iodine as methyl iodide at 60° C., ambient pressure, and 4 hr$^{-1}$ liquid hourly space velocity (LHSV). LHSV is understood to be the inverse of the average liquid residence time, and is computed by dividing the liquid flow rate into the bed volume.

The total iodine in the acetic acid effluent stream was less than 10 ppb by weight, as measured using gas chromatography (GC) equipped with an Electron Capture Detector (ECD), for the first 350 milliliters of feed treated in this manner. Iodine removal was therefore essentially complete during this period, after which the total effluent iodine concentration increased rapidly, marking the point of contaminant breakthrough. Based on these results, the calculated adsorbent capacity was 20.5 milligrams of elemental iodine per milliliter.

According to the process of the present invention, the spent adsorbent was then regenerated by suspending exposure to the contaminated acetic acid solution and initiating instead a flow of a 20% sodium thiosulfate ($Na_2S_2O_3$) stripping solution until 200 ml of solution was passed over the spent adsorbent. This treatment removed essentially all of the silver iodide formed by the reaction of the silver with the methyl iodide feed contaminant. After the contacting with stripping solution, the stripped adsorbent was then reactivated with a reactivation solution of 2% silver nitrate ($AgNO_3$) until 300 ml was charged to the adsorbent. The reactivation effectively converted the zeolite component of the adsorbent from its hydrogen form (a consequence of use in the original adsorptive service) to its active, silver-exchanged form. The same temperature and pressure were maintained for the stripping and reactivating procedures as for the methyl iodide adsorption. The flow rate used for both the stripping and reactivating steps was 1 hr$^{-1}$ LHSV.

The adsorbent, having been regenerated according to this simple 2-step procedure, was again tested for adsorption of methyl iodide from acetic acid. The starting, contaminated feed solution in this case contained 546 ppm of iodine as methyl iodide. Breakthrough of methyl iodide to >10 ppb in the treated effluent occurred after 480 ml of acetic acid was processed, so that the regenerated adsorbent capacity was 26.2 milligrams of elemental iodine per milliliter, somewhat higher than the value calculated for fresh adsorbent. This example therefore demonstrates the utility of the regeneration process to prolong the effective life of the adsorbent.

What is claimed is:

1. A process for regenerating an adsorbent which is at least partially spent, the adsorbent comprising a solid carrier, a reactive metal dispersed thereon, and a reaction product of the reactive metal and a contaminant, the process comprising:

(a) stripping the adsorbent with a stripping solution comprising an aqueous solution of an alkai metal compound of an anion selected from the group consisting of thiosulfate, cyanide, iodide, and mixtures thereof a stripping conditions, thereby removing at least a portion of the reaction product and yielding a stripped absorbent and an effluent stream containing the reaction product; and (b) reactivating the stripped absorbent with a reactivation solution of a compound of the reactive metal at reactivation conditions, thereby dispersing an effective amount of reactive metal onto the absorbent.

2. The process of claim 1 where the reactive metal is selected from the group consisting of silver, mercury, copper, lead, thallium, palladium and mixtures thereof.

3. The process of claim 1 where the solid carrier comprises a resin or a molecular sieve.

4. The process of claim 1 where the reaction product is a metal halide.

5. The process of claim 4 where the halide is iodide.

6. The process of claim 1 where the stripping conditions include an absolute pressure from about 0.5 atmospheres to about 5 atmospheres, a temperature from about 20° C. to about 150° C., and a liquid hourly space velocity from about 0.1 hr$^{-1}$ to about 10 hr$^{-1}$.

7. The process of claim 1 where the reactivation conditions include an absolute pressure from about 0.5 atmospheres to about 5 atmospheres, a temperature from about 20° C. to about 100° C., and a liquid hourly space velocity from about 0.1 hr$^{-1}$ to about 10 hr$^{-1}$.

8. The process of claim 1 where the alkali metal compound concentration is from about 2% to about 50% by weight of the solution.

9. The process of claim 1 where the reactivation solution comprises an acetate, nitrate, or halide compound of the reactive metal.

10. The process of claim 9 where the compound concentration is from about 0.1% to about 10% by weight of the solution.

11. The process of claim 1 where in step (b) the metal dispersed onto the adsorbent is about 0.5 to about 1.5 times the amount originally dispersed onto the adsorbent.

12. The process of claim 1, further comprising contacting the effluent stream containing the reaction product with a secondary adsorbent at conditions effective to adsorb the reaction product and yield a treated effluent stream.

13. The process of claim 12 where the secondary adsorbent is activated carbon.

* * * * *